(12) United States Patent
Huang et al.

(10) Patent No.: US 8,335,939 B2
(45) Date of Patent: Dec. 18, 2012

(54) NOTEBOOK COMPUTER

(75) Inventors: Chung-Chi Huang, Taipei Hsien (TW); Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 317 days.

(21) Appl. No.: 12/886,511

(22) Filed: Sep. 20, 2010

(65) Prior Publication Data

US 2012/0051029 A1 Mar. 1, 2012

(30) Foreign Application Priority Data

Aug. 30, 2010 (CN) .......................... 2010 1 0266863

(51) Int. Cl.
*G06F 1/32* (2006.01)
*G06F 1/26* (2006.01)
*H05B 33/08* (2006.01)

(52) U.S. Cl. ........ 713/323; 713/320; 713/321; 713/324; 323/282

(58) Field of Classification Search ........................ None
See application file for complete search history.

(56) References Cited

U.S. PATENT DOCUMENTS

| 2012/0051029 A1* | 3/2012 | Huang et al. ..................... 362/85 |
| 2012/0086644 A1* | 4/2012 | Huang et al. ................... 345/168 |

FOREIGN PATENT DOCUMENTS

EP 1 033 903 A2 * 9/2000

* cited by examiner

*Primary Examiner* — Tanh Nguyen
(74) *Attorney, Agent, or Firm* — Altis Law Group, Inc.

(57) ABSTRACT

A notebook computer includes a keyboard, a display, a light source arranged on the keyboard or the display, and a light source control circuit. The light source control circuit includes first to third electronic switches. A control terminal of the first electronic switch is connected to a working voltage terminal. A first terminal of the first electronic switch is connected to a first terminal of the light source and a first terminal of the third electronic switch. A second terminal of the light source is connected to a standby voltage terminal. A control terminal of the second electronic switch is connected to a sleep signal terminal. A first terminal of the second electronic switch is connected to the standby voltage terminal and a control terminal of the third electronic switch. Second terminals of the first to third electronic switches are grounded.

11 Claims, 3 Drawing Sheets

NOTEBOOK COMPUTER

BACKGROUND

1. Technical Field

The present disclosure relates to a notebook computer.

2. Description of Related Art

Nowadays, notebook computers are used widely. The benefit of the notebook computers is that they are portable. However, in dark environments, a user may not be able to see the keyboard to operate the notebook computer unless the keyboard is backlighted. But many of these backlit keyboards are expensive and consumes a lot of power. Therefore there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
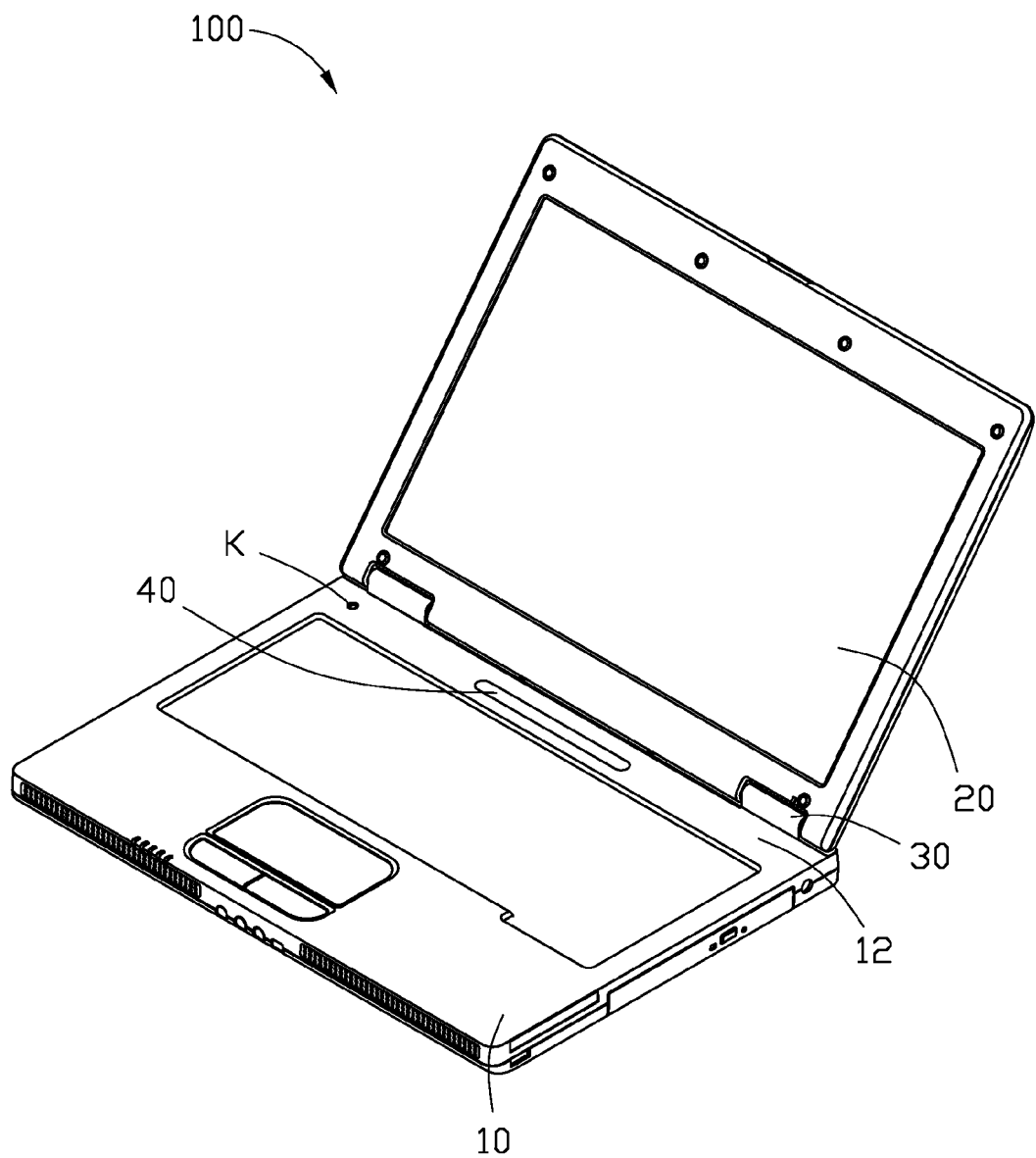
FIG. 1 is a schematic, isometric view of a first embodiment of a notebook computer.

Referring to FIG. 1, a first embodiment of a notebook computer 100 includes a keyboard 10 and a display 20 pivotably mounted to the keyboard 10. In general, the keyboard 10 is connected to the display 20 through a hinge 30. The keyboard 10, the display 20, and the hinge 30 fall within well-known technologies, and are therefore not described here.

Figure 2:
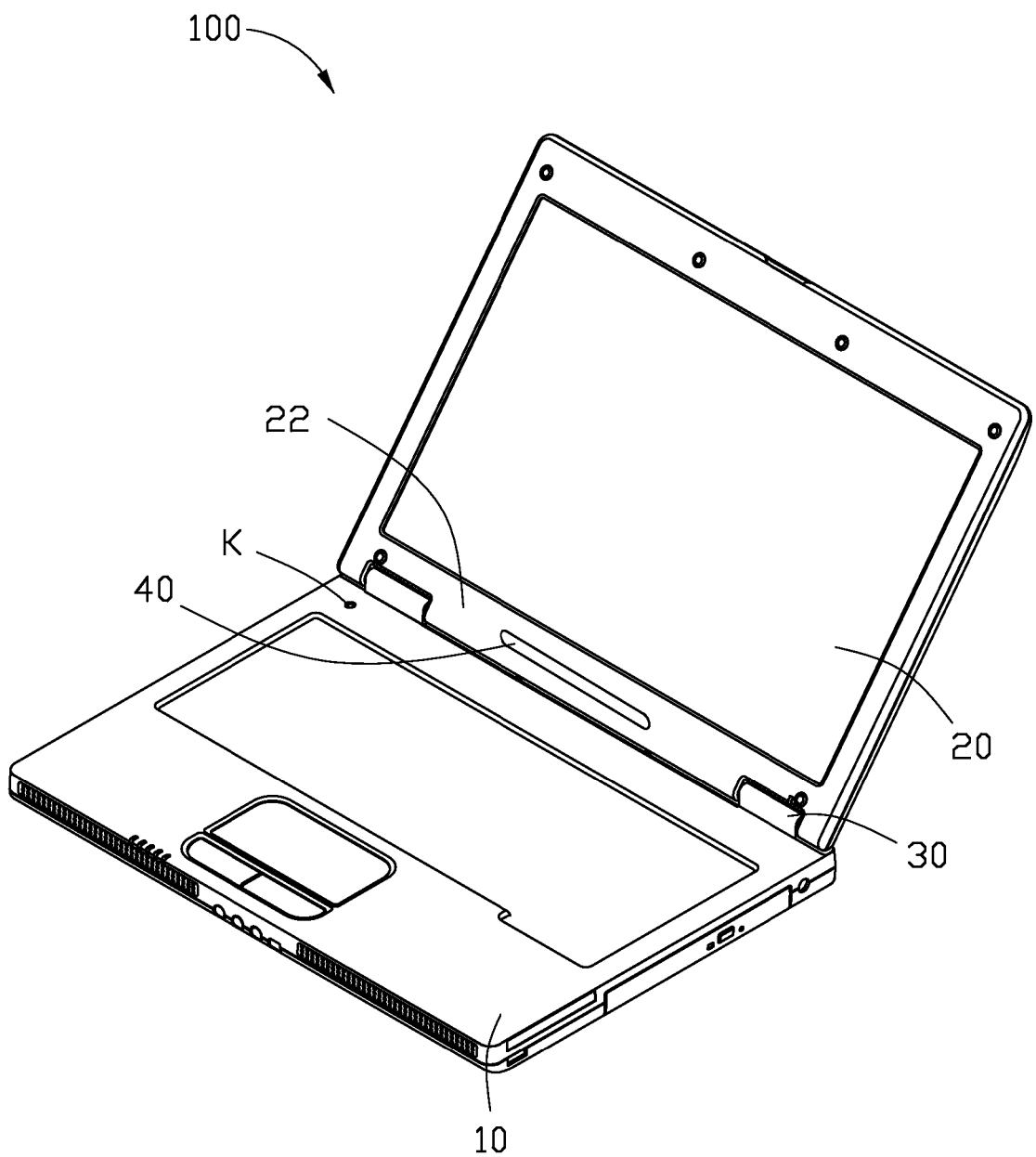
FIG. 2 is a schematic, isometric view of a second embodiment of a notebook computer.

A strip-shaped light source 40 is arranged in the middle of the rear end 12 of the keyboard 10, near the hinge 30. Referring to FIG. 2, in a second embodiment of a notebook computer 100, the strip-shaped light source 40 is arranged in the middle of the bottom end 22 of the display 20, near the hinge 30. The light sources 40 of the first and second embodiments both can increase the illumination of the keyboard 10. In other embodiments, the notebook computer 100 may include two light sources 40 respectively arranged in the middle of the rear end 12 of the keyboard 10 and the middle of the bottom end 22 of the display 20. In one embodiment, the light source 40 is a light-emitting diode (LED).

Figure 3:
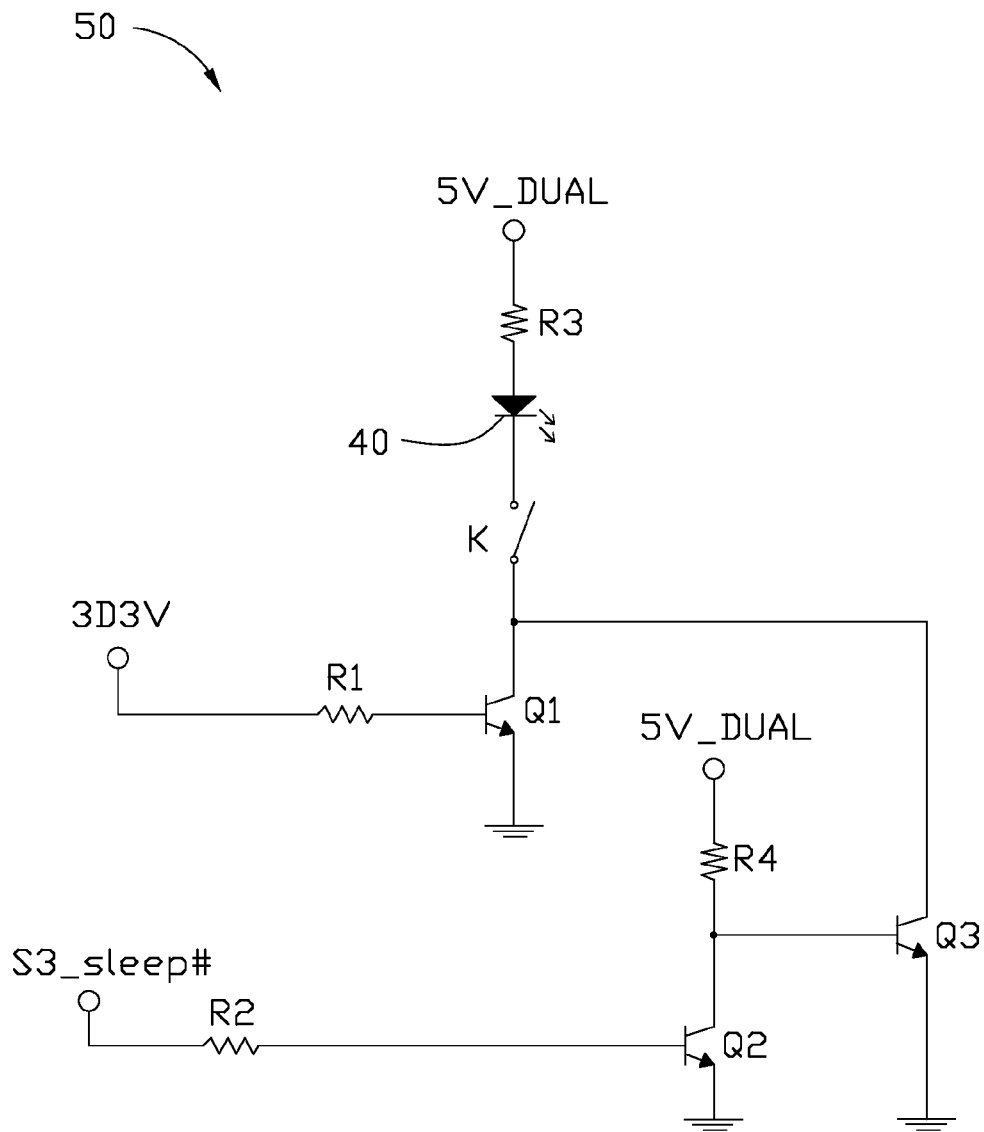
FIG. 3 is a partial circuit diagram of both notebook computers of FIGS. 1 and 2.

Referring to FIG. 3, the notebook computer 100 of both of the first and second embodiments further include a light source control circuit 50 used to control the light source 40. The control circuit 50 includes a manual switch K, four resistors R1-R4, and three npn transistors Q1-Q3. In other embodiments, the three npn transistors Q1-Q3 can be changed to other kinds of electronic switches, such as field-effect transistors. The manual switch K can be arranged on any place of the notebook computer 100, such as on the keyboard 10.

A first terminal of the resistor R1 is connected to a working voltage terminal 3D3V of the notebook computer 100. The working voltage terminal 3D3V supplies a working voltage, such as 3.3 volts (V), when the notebook computer 100 is in a working state. However, the working voltage terminal 3D3V does not supply the working voltage when the notebook computer 100 is in a sleep state. The second terminal of the resistor R1 is connected to the base of the transistor Q1. The emitter of the transistor Q1 is grounded. The collector of the transistor Q1 is connected to the cathode of the light source 40 through the manual switch K. The collector of the transistor Q1 is also connected to the collector of the transistor Q3. The anode of the light source 40 is connected to the standby voltage terminal 5V_DUAL of the notebook computer 100 through the resistor R3. The standby voltage terminal 5V_DUAL supplies a standby voltage, such as 5V, when the notebook computer 100 is in both the working state and the sleep state. A first terminal of the resistor R2 is connected to a sleep signal terminal S3_sleep# of the notebook computer 100. The sleep signal terminal S3_sleep# supplies a high voltage signal, such as 5V, when the notebook computer 100 is in the working state. The sleep signal terminal S3_sleep# supplies a square wave signal when the notebook computer 100 is in the sleep state. A second terminal of the resistor R2 is connected to a base of the transistor Q2. The emitter of the transistor Q2 is grounded. The collector of the transistor Q2 is connected to the standby voltage terminal 5V_DUAL through the resistor R4. The emitter of the transistor Q3 is grounded. The base of the transistor Q3 is connected to the collector of the transistor Q2.

In use, if the notebook computer is in a working state and the manual switch K is turned on, the working voltage terminal 3D3V and the standby voltage terminal 5V_DUAL both supply voltages, therefore, the transistor Q1 is always turned on, while the light source 40 is turned on. At this time, the light source 40 indicates that the notebook computer 100 is in a working state, and illuminates the keyboard 10 to help the operators to use the keyboard 10 conveniently. A user also can manually turn off the manual switch K to turn off the light source 40 according to requirements.

If the notebook computer is in the sleep state, the working voltage terminal 3D3V does not supply voltage, therefore the transistor Q1 is always turned off. The sleep signal terminal S3_sleep# supplies a square wave signal. When the square wave signal is in a high voltage state, the transistor Q2 is turned on, and the transistor Q3 is turned off, therefore the light source 40 is turned off. When the square wave signal is in a low voltage state, the transistor Q2 is turned off, and the transistor Q3 is turned on, the light source 40 is turned on. Therefore, the light source 40 is working in an intermittent blinking state, which is used to indicate that the notebook computer 100 is in a sleep state.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A notebook computer comprising:
   a keyboard and a display;

a light source arranged on the keyboard or the display;

a working voltage terminal, wherein the working voltage terminal supplies a working voltage in response to the notebook computer being in a working state, and does not supply the working voltage in response to the notebook computer being in a sleep state;

a standby voltage terminal, wherein the standby voltage terminal supplies a standby voltage in response to the notebook computer being in the working state or the sleep state;

a sleep signal terminal, wherein the sleep signal terminal supplies a high voltage in response to the notebook computer being in the working state, the sleep signal terminal supplies a square wave signal in response to the notebook computer being in the sleep state; and a light source control circuit comprising first to third electronic switches;

wherein a control terminal of the first electronic switch is connected to the working voltage terminal, a first terminal of the first electronic switch is connected to a first terminal of the light source and a first terminal of the third electronic switch, a second terminal of the light source is connected to the standby voltage terminal, a control terminal of the second electronic switch is connected to the sleep signal terminal, a first terminal of the second electronic switch is connected to the standby voltage terminal and a control terminal of the third electronic switch, second terminals of the first to third electronic switches are grounded, wherein the first to third electronic switches are turned on in response to the control terminals being in high voltage states, and are turned off in response to the control terminals being in low voltage states.

2. The notebook computer of claim 1, wherein the first to third electronic switches are npn transistors, the control terminals, first terminals, and second terminals are respectively bases, collectors, and emitters of the npn transistors.

3. The notebook computer of claim 1, wherein the light source is arranged in a middle of a rear end of the keyboard or arranged in a middle of a bottom end of the display.

4. The notebook computer of claim 3, wherein the light source is strip-shaped.

5. The notebook computer of claim 1, wherein a resistor is connected between the working voltage terminal and the control terminal of the first electronic switch.

6. The notebook computer of claim 1, wherein a resistor is connected between the sleep signal terminal and the control terminal of the second electronic switch.

7. The notebook computer of claim 1, wherein the light source is a light-emitting diode.

8. The notebook computer of claim 7, wherein the second terminal of the light source is an anode terminal, the first terminal of the light source is a cathode terminal.

9. The notebook computer of claim 8, wherein a resistor is connected between the standby voltage terminal and the anode of the light source.

10. The notebook computer of claim 1, wherein a resistor is connected between the standby voltage terminal and the first terminal of the second electronic switch.

11. The notebook computer of claim 1, further comprising a manual switch connected between the first terminal of the first electronic switch and the a first terminal of the light source.

* * * * *